United States Patent
Lei et al.

(10) Patent No.: US 9,925,920 B2
(45) Date of Patent: Mar. 27, 2018

(54) EXTENDED LANE BLIND SPOT DETECTION

(71) Applicant: Ford Global Technologies, LLC, Dearborn, MI (US)

(72) Inventors: Oliver Lei, Windsor (CA); Allen R. Murray, Lake Orion, MI (US); Tuan Anh Be, Livonia, MI (US); David Joseph Orris, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/162,772

(22) Filed: May 24, 2016

(65) Prior Publication Data

US 2017/0341576 A1    Nov. 30, 2017

(51) Int. Cl.
*B60Q 1/00*    (2006.01)
*B60Q 9/00*    (2006.01)

(52) U.S. Cl.
CPC ............................ *B60Q 9/008* (2013.01)

(58) Field of Classification Search
None
See application file for complete search history.

(56) References Cited

U.S. PATENT DOCUMENTS

| | | | |
|---|---|---|---|
| 5,295,021 A * | 3/1994 | Swanson | B60R 1/081 248/479 |
| 7,126,583 B1 | 10/2006 | Breed | |
| 7,161,472 B2 * | 1/2007 | Strumolo | G01V 3/15 180/167 |
| 8,622,558 B2 | 1/2014 | Kim | |
| 2002/0126002 A1 * | 9/2002 | Patchell | B60Q 9/008 340/436 |
| 2003/0039039 A1 | 2/2003 | Thomas et al. | |
| 2005/0195383 A1 * | 9/2005 | Breed | B60N 2/002 356/4.01 |
| 2005/0259033 A1 | 11/2005 | Levine | |
| 2007/0182528 A1 * | 8/2007 | Breed | B60Q 9/008 340/435 |
| 2008/0315050 A1 | 12/2008 | Buckley et al. | |
| 2010/0225738 A1 * | 9/2010 | Webster | B60R 11/04 348/36 |
| 2013/0093581 A1 | 4/2013 | Arai | |
| 2013/0222127 A1 * | 8/2013 | Ray Avalani | B60Q 9/008 340/436 |
| 2015/0296140 A1 * | 10/2015 | Kim | H04N 5/23238 348/38 |
| 2016/0318440 A1 * | 11/2016 | Salter | B60Q 1/2665 |
| 2017/0050568 A1 * | 2/2017 | Sobecki | B60R 1/074 |
| 2017/0076606 A1 * | 3/2017 | Gupta | B60K 35/00 |

* cited by examiner

*Primary Examiner* — Julie Lieu
(74) *Attorney, Agent, or Firm* — Frank A MacKenzie; Bejin Bieneman PLC

(57) ABSTRACT

A vehicle system includes at least one sensor that can detect a first target vehicle in a first blind spot and a second target vehicle in a second blind spot. The first blind spot is associated with an adjacent lane relative to a host vehicle and the second blind spot is associated with an extended lane relative to the host vehicle. A processor can generate a first alert signal when the first target vehicle is detected and a second alert signal when the second target vehicle is detected.

16 Claims, 9 Drawing Sheets

//EXTENDED LANE BLIND SPOT DETECTION

BACKGROUND

A blind spot, in the automotive context, refers to an area relative to a host vehicle that is not easily observed by the driver. It is common for a blind spot to exist next to and toward the rear of the host vehicle. This blind spot is sometimes referred to as the rear quarter blind spot. Observing vehicles in the rear quarter blind spot often requires the driver to physically turn his or her head, body, or both. Blind spot monitoring is a vehicle feature that attempts to notify drivers when a target vehicle is believed to be in the host vehicle's rear quarter blind spot.

DETAILED DESCRIPTION

The transient nature of vehicles makes blind spot detection difficult. Prior to executing a lane change, a driver will glance over his or her shoulder to look for a vehicle in the rear quarter blind spot. If no vehicle is there, the driver may complete the lane change. If a vehicle is there, the driver will have to wait to complete the lane change until the rear quarter blind spot is clear. Alternatively, the driver may accelerate or decelerate the vehicle to expedite the clearing of the rear quarter blind spot.

A situation could arise where a driver checks the rear quarter blind spot and begins to execute a lane change without realizing that a vehicle is fast approaching. Thus, the approaching vehicle could enter the rear quarter blind spot between the time it takes for the driver to check the rear quarter blind spot and for the driver to complete the lane change. Further, many drivers often only check the rear quarter blind spot of the adjacent lane. They may not realize that a vehicle is in the rear quarter blind spot of an extended lane (e.g., two lanes over). This could be a problem if both vehicles attempt to move into the same lane at the same time.

An example extended lane blind spot detection system includes at least one sensor that detects a first target vehicle in a first blind spot and a second target vehicle in a second blind spot. The first blind spot is associated with an adjacent lane relative to a host vehicle and the second blind spot is associated with an extended lane relative to the host vehicle. A processor generates a first alert signal when the first target vehicle is detected and a second alert signal when the second target vehicle is detected.

The extended lane blind spot detection system can detect vehicles in the adjacent lane and in the extended lane and notify the driver of the host vehicles when such other vehicles are present. The notifications by the extended lane blind spot detection system can serve as a back-up to the situation where the driver looks over his or her shoulder for vehicles in the rear quarter blind spot in the adjacent lane, the extended lane, or both, as well as help the driver make decisions about when to start a lane change, whether to complete a lane change, or whether to abort a lane change by, e.g., moving back to the previous lane.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
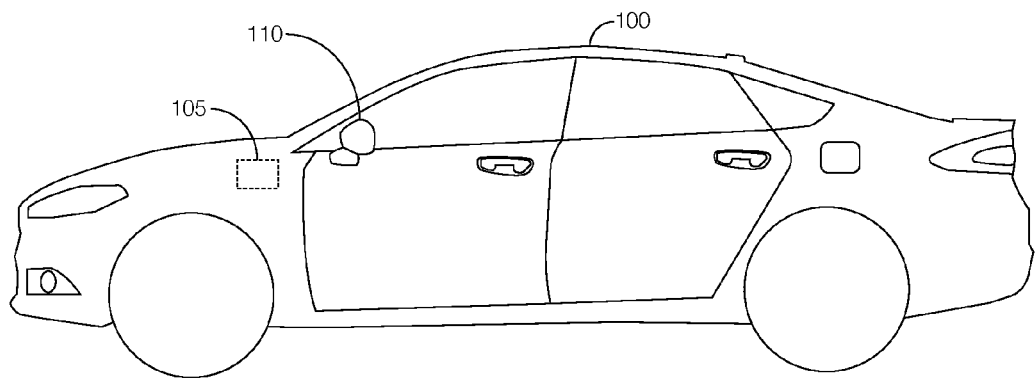
FIG. 1 illustrates an example host vehicle with an extended lane blind spot detection system.

As illustrated in FIG. 1, a host vehicle 100 includes an extended blind spot detection system 105 that can detect target vehicles in an adjacent lane blind spot (sometimes called the "rear quarter blind spot") and an extended lane blind spot. The terms "present," "adjacent," and "extended" are with reference to the location of the host vehicle 100. The "present lane" is the lane in which the host vehicle 100 is travelling. The "adjacent lane" is the lane immediately next to the present lane. It could also refer to a lane that eventually merges with the present lane, such as when the present lane is a freeway onramp. The "extended lane" is two or more lanes over from the present lane. Thus, the adjacent lane may be between the present lane and the extended lane.

The adjacent lane, the extended lane, or both, can be to the left or to the right of the host vehicle 100. On a roadway with two lanes, there is one present lane and one adjacent lane. On a roadway with three lanes, there is one present lane and either two adjacent lanes (if the present lane is in the middle) or one adjacent lane and one extended lane (if the present lane is the left-most or right-most lane). On a roadway with more than three lanes, there is one present lane, one or two adjacent lanes (depending on whether the present lane is the left-most, right-most, or one of the center lanes), and one or more extended lanes.

The extended lane blind spot detection system 105 detects target vehicles in the blind spots of the adjacent and extended lanes. It also alerts the driver when such target vehicles are detected. The alert could be presented audibly, visually, or both. An audible alert includes a beep or other noise played inside the passenger compartment of the host vehicle 100. A visual alert includes illuminating the appropriate indicator lights located in a side view mirror 110.

The extended lane blind spot detection system 105 can further detect when a target vehicle is fast approaching the adjacent or extended lane blind spot and may generate alerts under these scenarios. The alerts generated when a target vehicle is fast approaching one of the blind spots may include a different sound inside the passenger compartment, flashing the appropriate indicator lights, or illuminating the appropriate indicator lights using a different color than if the target vehicle is already in one of the blind spots.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle that operates in an autonomous (e.g., driverless) mode, a partially autonomous mode, and/or a non-autonomous mode.

Figure 2:
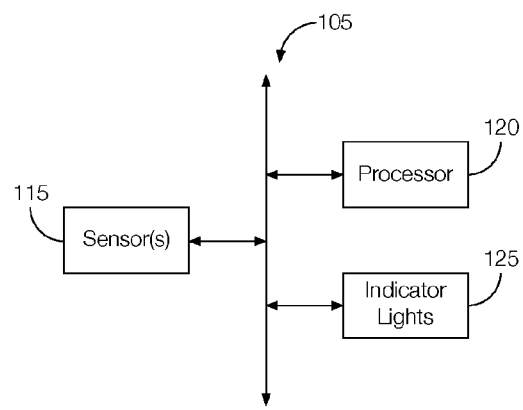
FIG. 2 illustrates example components of the extended lane blind spot detection system.

Referring now to FIG. 2, the extended lane blind spot detection system 105 includes sensors 115, a processor 120, and indicator lights 125A.

The sensors 115 include electronic components that detect target vehicles in the adjacent lane, the extended lane, or both. Examples of sensors 115 may include a radar sensor, a lidar sensor, a visual sensor (e.g., a camera), an ultrasound sensor, etc. The extended lane blind spot detection system 105 may include any number of sensors 115, and the sensors 115 may be of the same or different types. For instance, a visual sensor or an ultrasound sensor may be used to detect target vehicles in the adjacent lane while a radar or lidar sensor may be used to detect target vehicles in the extended lane. Some sensors 115 may also or alternatively be used to detect target vehicles approaching one of the blind spots. The sensors 115 may be placed at various locations relative to the host vehicle 100. The sensors 115 could be incorporated into one of the side view mirrors 110 or on the rear bumper, for example. In some possible approaches, the side view mirror 110 can be removed altogether and replaced entirely with a sensor 115. Also, different sensors 115 can be used to detect target vehicles on different sides of the host vehicle 100. That is, one or more sensors 115 may be used to detect driver-side target vehicles and one or more other sensors 115 may be used to detect passenger-side target vehicles.

Each sensor 115 is programmed to output a detection signal representing whether a target vehicle is detected. The detection signal may represent that a target vehicle is in an area covered by the sensor 115. Thus, the sensor 115 covering the adjacent lane blind spot outputs a detection signal when the target vehicle is detected in the adjacent lane. Likewise, the sensor 115 covering the extended lane blind spot outputs a detection signal when the target vehicle is detected in the extended lane. The detection signals are output to the processor 120.

In addition, the sensors 115 may output detection signals indicating that a target vehicle is approaching one of the blind spots. These sensors 115 could be the same or different sensors 115 used to detect when target vehicles are actually in the blind spot. Further, the detection signals generated in response to a target vehicle approaching one of the blind spots may be output to the processor 120. Detecting the target vehicle moving toward one of the blind spots could include situations where the target vehicle is attempting a lane change maneuver that, when complete, will place the target vehicle in one of the blind spots of the host vehicle 100.

The processor 120 includes electronic components, including any number of circuits, that process the detection signals output by the sensors 115 and outputs alert signals in accordance with the detection signals received. The processor 120 receives the detection signal output by the sensor 115, determines where the target vehicle is detected, and generates the appropriate alert signal. The processor 120 determines where the target vehicle is detected based on the sensor 115 that output the detection signal. For instance, if the sensor 115 that output the detection signal is looking for target vehicles in the driver-side adjacent lane blind spot of the host vehicle 100, the processor 120 may determine that the target vehicle is in the adjacent lane blind spot on the driver side of the host vehicle 100. If the sensor 115 that output the detection signal is looking for target vehicles in the driver-side extended lane blind spot of the host vehicle 100, the processor 120 may determine that the target vehicle is in the extended lane blind spot on the driver side of the host vehicle 100. If the sensor 115 that output the detection signal is looking for target vehicles in the passenger-side adjacent lane blind spot of the host vehicle 100, the processor 120 may determine that the target vehicle is in the adjacent lane blind spot on the passenger side of the host vehicle 100. If the sensor 115 that output the detection signal is looking for target vehicles in the passenger-side extended lane blind spot of the host vehicle 100, the processor 120 may determine that the target vehicle is in the extended lane blind spot on the passenger side of the host vehicle 100. The processor 120 can generate and output alert signals representing any one of these and other scenarios.

Besides simply determining whether a target vehicle is in the blind spot, the processor 120 may be programmed to detect target vehicles quickly approaching one of the blind spots. That is, the processor 120 may determine whether the speed of an approaching target vehicle is above a predetermined speed relative to the host vehicle 100. If so, the target vehicle is likely to overtake the host vehicle 100, which means that the target vehicle will be in one of the blind spots of the host vehicle 100 at some point relatively soon. The processor 120 may generate alert signals to warn the driver of the host vehicle 100 of such instances.

The detection of quickly approaching vehicles may be handled by the same sensors 115 as those discussed above. Alternatively, the processor 120 may detect quickly approaching vehicles other ways such as, e.g., via a vehicle-to-vehicle or vehicle-to-infrastructure communication protocol like the dedicated short range communication (DSRC) protocol. The target vehicle could communicate its speed and heading, directly or indirectly, to the host vehicle 100. Alternatively, the host vehicle 100 could receive the speed and heading from other nearby vehicles or infrastructure devices that detected the target vehicle and wirelessly transmitted detection signals to the host vehicle 100.

The processor 120 may determine the speed of the host vehicle 100 and compare the speed to a predetermined speed relative to that of the host vehicle 100. The predetermined speed relative to the speed of the host vehicle 100 may include, e.g., 5 mph faster than the host vehicle 100, 10 mph faster than the host vehicle 100, 20 mph faster than the host vehicle 100, etc. If the processor 120 determines that a target vehicle is quickly approaching the driver-side adjacent lane blind spot of the host vehicle 100, the processor 120 may determine that the target vehicle is about to enter the adjacent lane blind spot on the driver side of the host vehicle 100. If the processor 120 determines that the target vehicle is quickly approaching the driver-side extended lane blind spot of the host vehicle 100, the processor 120 may determine that the target vehicle is about to enter in the extended lane blind spot on the driver side of the host vehicle 100. If the processor 120 determines that the target vehicle is quickly approaching the passenger-side adjacent lane blind spot of the host vehicle 100, the processor 120 may determine that the target vehicle is about to enter the adjacent lane blind spot on the passenger side of the host vehicle 100. If the processor 120 determines that the target vehicle is quickly approaching the passenger-side extended lane blind spot of the host vehicle 100, the processor 120 may determine that the target vehicle is about to enter the extended lane blind spot on the passenger side of the host vehicle 100. The processor 120 can generate and output alert signals representing any one of these or other scenarios.

The alert signals generated by the processor 120 may be output to particular indicator lights 125A as well as to other vehicle systems. The alert signals output by the processor 120 may cause one or more indicator lights 125A to flash or illuminate. Further, the alert signals may cause an infotainment system inside the passenger compartment of the host vehicle 100 to present an audible alert indicating the presence and location of a target vehicle in one of the blind spots.

The indicator lights 125A may include any number of electronic components that can illuminate in response to receiving the alert signal from the processor 120. Illuminator lights may be incorporated into the driver- and passenger-side side view mirrors 110 on both the driver and passenger side. For instance, as shown in FIGS. 4A-4D, each side view mirror 110 includes two indicator lights 125A, one for indicating target vehicles in or quickly approaching the adjacent lane and one for indicator target vehicles in or quickly approaching the extended lane. The indicator lights 125A may each operate in different modes depending on the type of alert signal received. For instance, the indicator light 125 may remain illuminated (steady state) when a target vehicle is detected in the corresponding blind spot. The indicator light 125 may flash when a target vehicle quickly approaching the corresponding blind spot is detected. Alternatively or in addition, the indicator light 125 may shine one color when a target vehicle is detected in the corresponding blind spot and a different color when a target vehicle is quickly approaching the corresponding blind spot. The alert signal output by the processor 120 may designate whether the indicator light 125 should turn on, flash, or shine a particular color. Thus, by glancing at which indicator lights 125A are illuminated, and whether the indicator lights 125A are flashing or shining a particular color, the driver of the host vehicle 100 will know if a target vehicle has been detected in one of the blind spots, and if so, the blind spot in which the target vehicle has been detected. The driver will also know if a target vehicle quickly approaching one of the blind spots has been detected.

FIGS. 3A-3F illustrate example scenarios 300 where the extended lane blind spot detection system 105 may alert the driver to various target vehicles in the blind spot of the host vehicle 100. The scenarios 300 illustrate different arrangements of the target vehicle 305 relative to the host vehicle 100 and example arrangements of an example adjacent lane 310, an example extended lane 315, or both relative to the host vehicle 100 in the present lane 320. Further, for purposes of illustration, also shown are the field of view 325 through the side view mirror 110, the adjacent lane blind spot 330 as monitored by one sensor 115, and the extended lane blind spot 335 as monitored by the same or a different sensor 115.

Figure 3A:
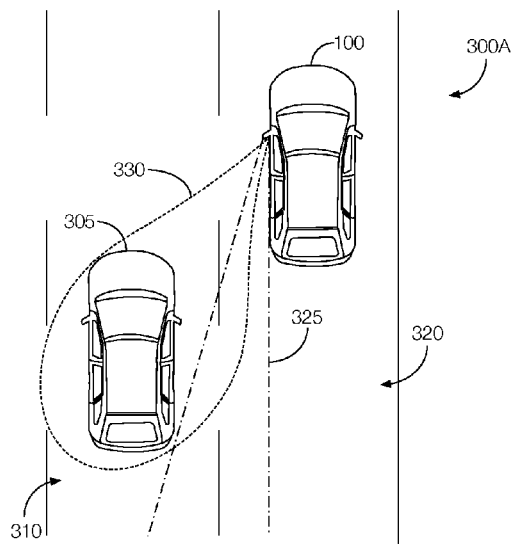
FIGS. 3A-3F illustrate example scenarios where the extended lane blind spot detection system may alert the driver to various target vehicles in the blind spot of the host vehicle.

FIG. 3A illustrates a scenario 300A where the target vehicle 305 is in the adjacent lane blind spot (i.e., the rear quarter blind spot) relative to the host vehicle 100. The host vehicle 100 is in the present lane 320, and in this example scenario 300A, the adjacent lane 310 is on the driver side of the host vehicle 100. For this scenario 300A, the extended lane blind spot detection system 105 may illuminate one of the indicator lights 125A indicating that the target vehicle 305 is in the adjacent lane blind spot 330.

Figure 3B:
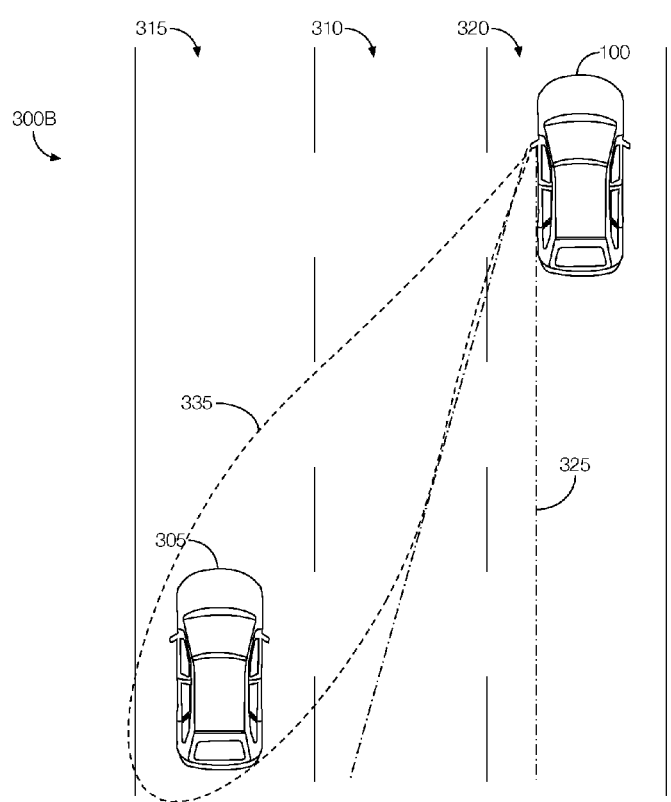
Figure 3C:
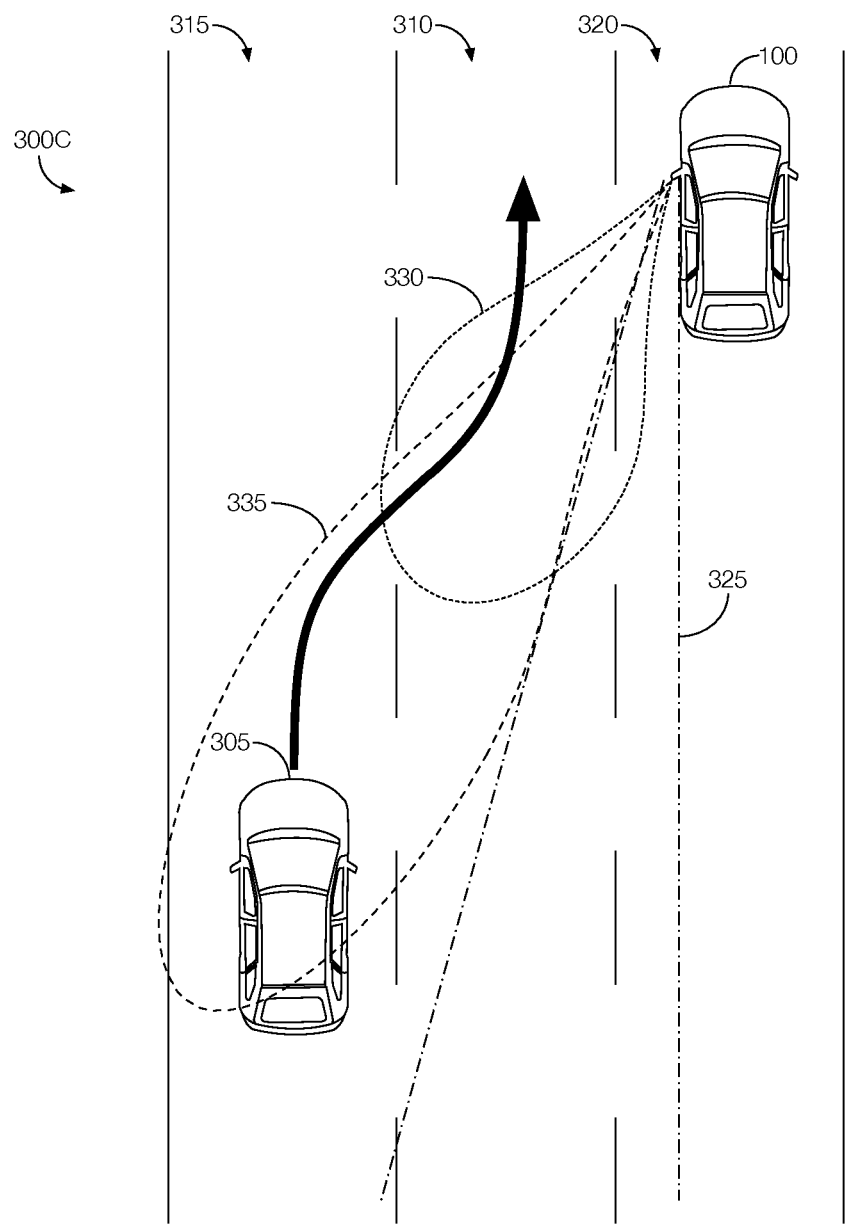

FIGS. 3B and 3C illustrate scenarios 300B-C where the target vehicle 305 is in the extended lane 315 relative to the host vehicle 100. The extended lane 315 in scenarios 300 B-C is two lanes over from the present lane 320 on the driver side, with the adjacent lane 310 between the present lane 320 and the extended lane 315. For scenario 300B, the extended lane blind spot detection system 105 may illuminate one of the indicator lights 125A indicating that the target vehicle 305 is in the extended lane blind spot 335. The same is true, at least initially for scenario 300C. That is, initially, one of the indicator lights 125A is illuminated indicating that the target vehicle 305 is in the extended lane blind spot 335. The extended lane blind spot detection system 105 may, as discussed above, determine that the target vehicle 305 is quickly moving toward the adjacent lane blind spot 330 while executing the lane change maneuver. Thus, the extended lane blind spot detection system 105 may flash the appropriate indicator light 125 to alert the driver of the host vehicle 100 that the target vehicle 305 is moving toward the adjacent lane blind spot 330. That indicator light 125 may flash while the indicator light 125 associated with the extended lane blind spot 335 remains illuminated, at least until the target vehicle 305 is no longer in the extended lane blind spot 335 (e.g., the lane change maneuver is complete).

Figure 3D:
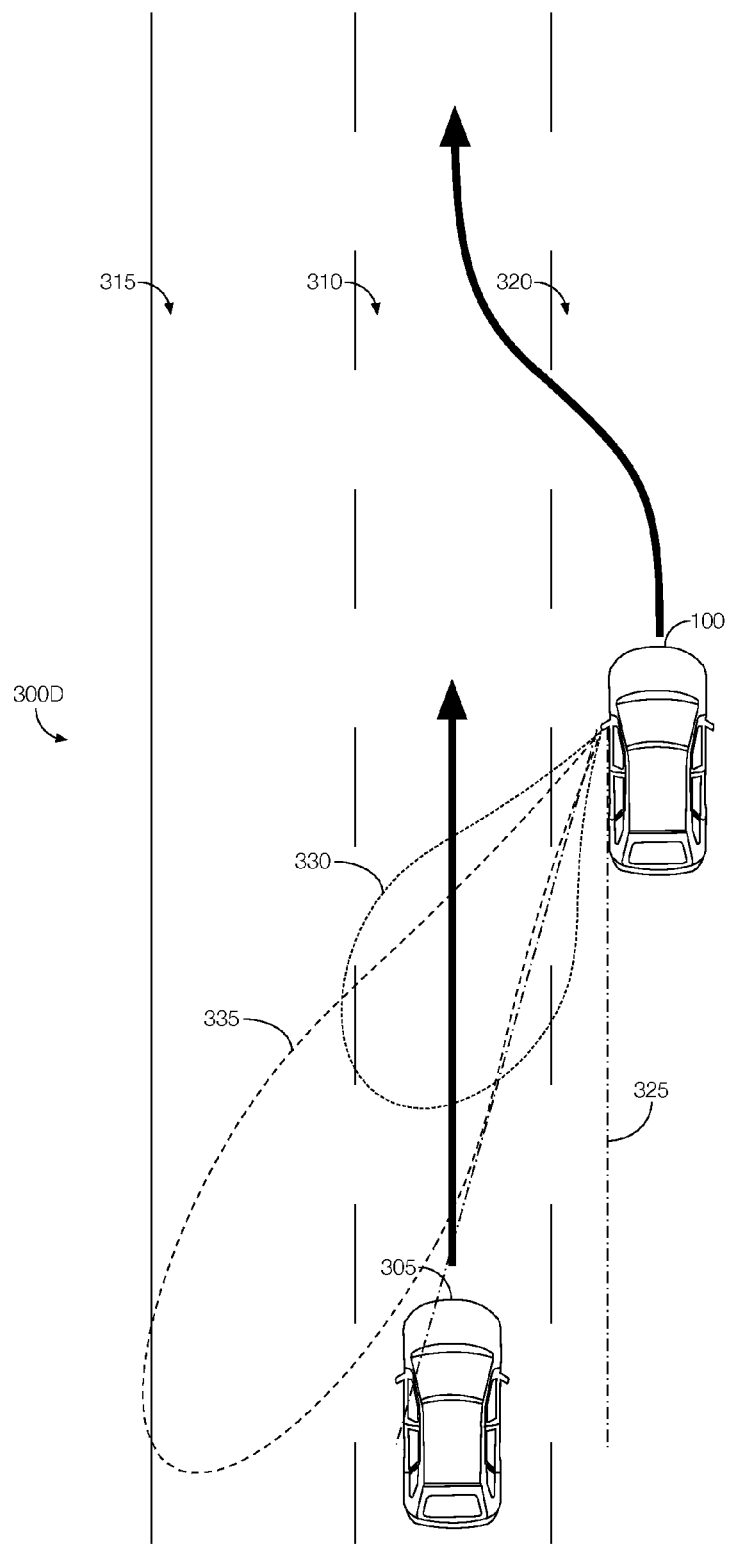

FIG. 3D illustrates a scenario 300D where the target vehicle 305 is in the adjacent lane 310 and quickly approaching, but not yet in, the adjacent lane blind spot 330. Sometimes this is not a problem, especially if the target vehicle 305 is going to quickly pass the host vehicle 100. As shown in scenario 300D, however, the driver of the host vehicle 100 wants to execute a lane change. The driver may not be able to tell how quickly the target vehicle 305 is moving. Thus, the driver of the host vehicle 100 may not realize that the target vehicle 305 may be in the adjacent lane blind spot 330 when the host vehicle 100 begins to move into the adjacent lane 310. In this scenario 300D, the extended lane blind spot detection system 105 may flash the indicator light 125 associated with the adjacent lane blind spot 330 to warn the driver of the host vehicle 100 that a target vehicle is about to enter the adjacent lane blind spot 330.

Figure 3E:
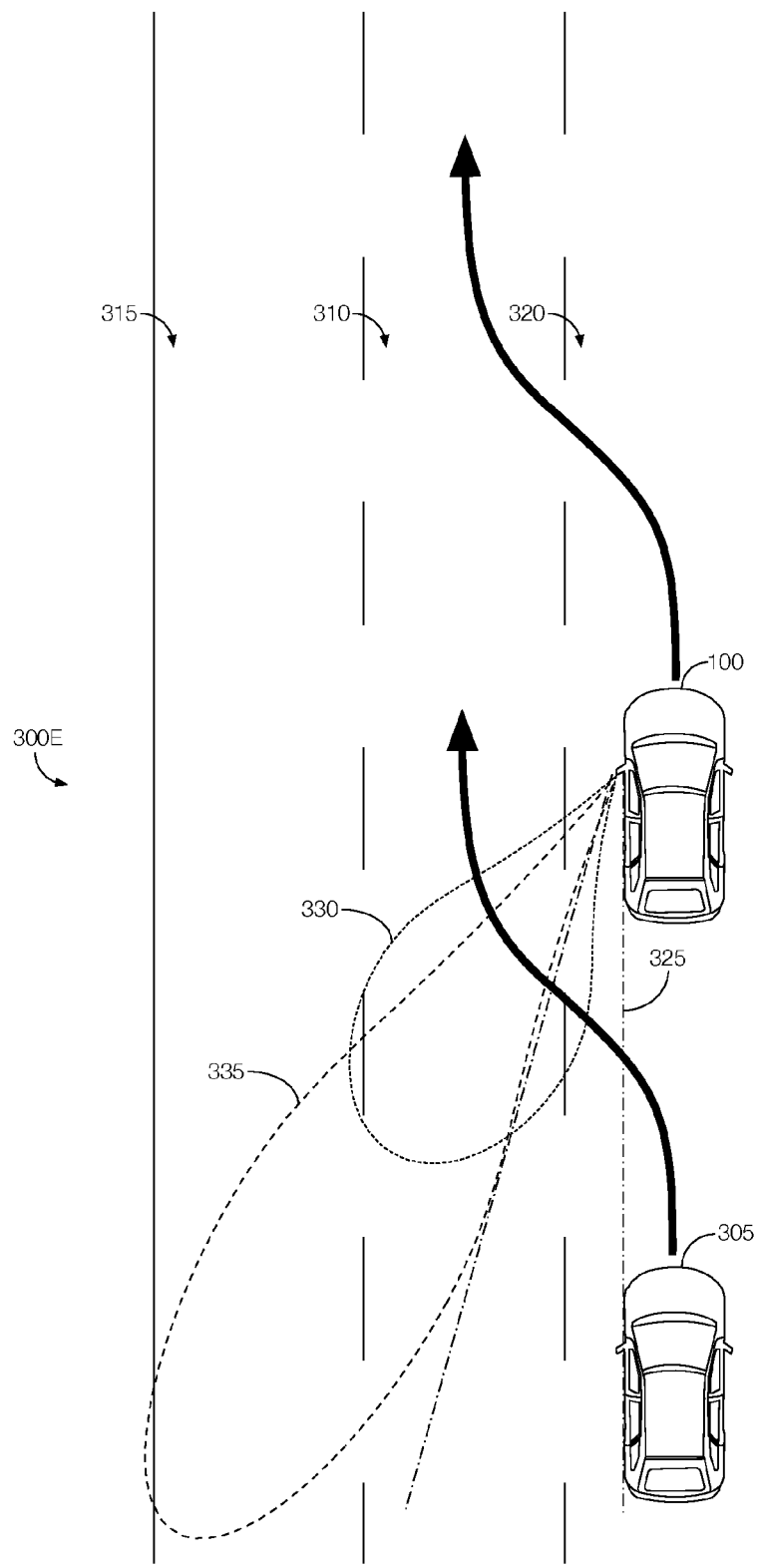

FIG. 3E illustrates a scenario 300E where the target vehicle 305 and the host vehicle 100 are initially in the same lane (i.e., the present lane 320) but the target vehicle 305 moves into the adjacent lane 310. At some point while the target vehicle 305 is moving into the adjacent lane 310, the extended lane blind spot detection system 105 may detect the target vehicle 305 in the adjacent lane, which would make this scenario 300E similar to scenario 300D discussed above with respect to FIG. 3D.

Figure 3F:
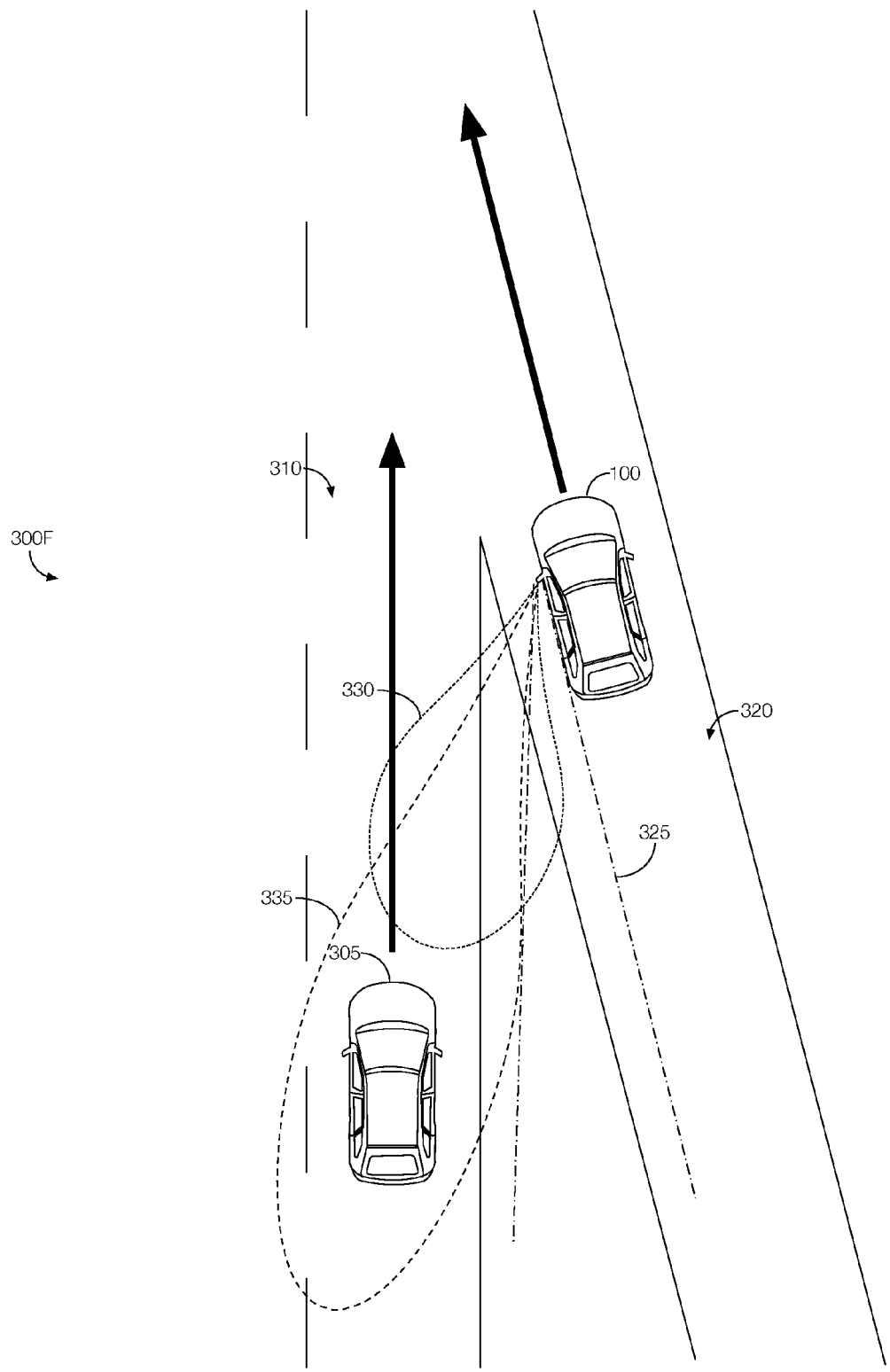

FIG. 3F illustrates a scenario 300F where the present lane 320 is an onramp or otherwise separated from, but will eventually merge into, the adjacent lane 310. As shown, the target vehicle 305 is in the extended lane blind spot 335 of the host vehicle 100. Thus, the indicator light 125 associated with the extended lane blind spot 335 may illuminate to warn the driver of the host vehicle 100 that a target vehicle 305 is nearby. Further, if the target vehicle 305 is quickly approaching the adjacent lane blind spot 330, the extended lane blind spot detection system 105 may further flash the indicator light 125 associated with the adjacent lane blind spot 330 to warn the driver of the host vehicle 100 that a target vehicle is quickly moving toward the adjacent lane blind spot 330 to help the driver avoid a potential collision when the lanes ultimately merge.

For each of the scenarios 300A-F, in addition to illuminating the indicator lights 125A, the extended lane blind spot detection system 105 may further generate audible alerts inside the passenger compartment of the host vehicle 100. The audible alerts may indicate the particular scenario 300 (e.g., whether the target vehicle 305 is in or approaching one of the blind spots, and if so, the audible alert may identify which blind spot and on which side of the host vehicle 100 is the subject of the alert)

FIGS. 4A-4D illustrate example side view mirrors 110 with multiple indicator lights 125A illuminated in accordance with various scenarios 300. Each side view mirror 110 shown is equipped with two indicator lights 125A. A first indicator light 125A may be used to alert the driver of the host vehicle 100 to issues associated with the adjacent lane blind spot and a second indicator lights 125B may be used to alert the driver of the host vehicle 100 to issues associated with the extended lane blind spot. Further, although shown as a driver-side side view mirror 110, similar indicator lights 125A may be incorporated into the passenger-side side view mirror.

Figure 4A:
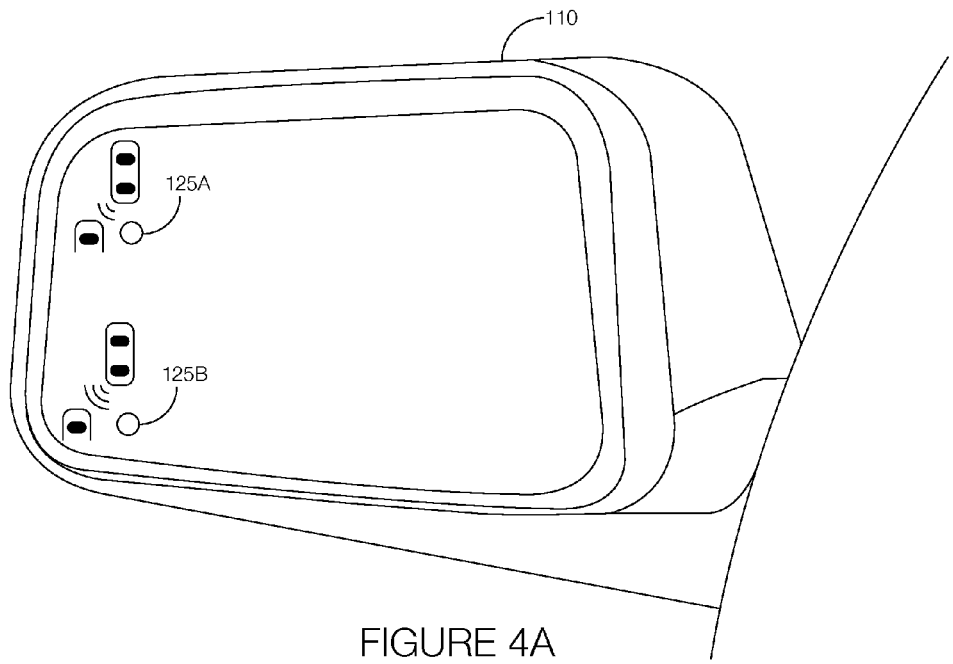
FIGS. 4A-4D illustrate example side view mirrors with multiple indicator lights illuminated in accordance with various scenarios.

In FIG. 4A, neither the first indicator light 125A nor the second indicator light 125B are illuminated, meaning that no target vehicles are detected in either the adjacent lane blind spot or the extended lane blind spot. Further, neither the first indicator light 125A nor the second indicator light 125B are flashing, meaning that no target vehicles have been detected quickly approaching the adjacent lane blind spot or the extended lane blind spot.

Figure 4B:
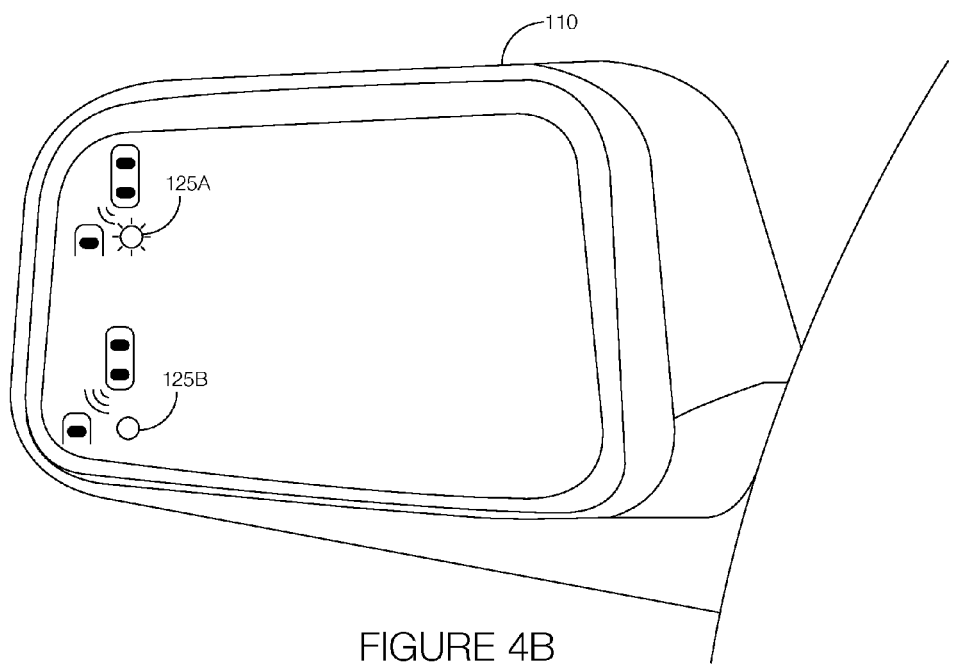

In FIG. 4B, the first indicator lights 125A is illuminated or flashing. It will be illuminated if the extended lane blind spot detection system 105 detects a target vehicle in the adjacent lane blind spot. It will flash if the extended lane blind spot detection system 105 detects the target vehicle moving quickly toward the adjacent lane blind spot.

Figure 4C:
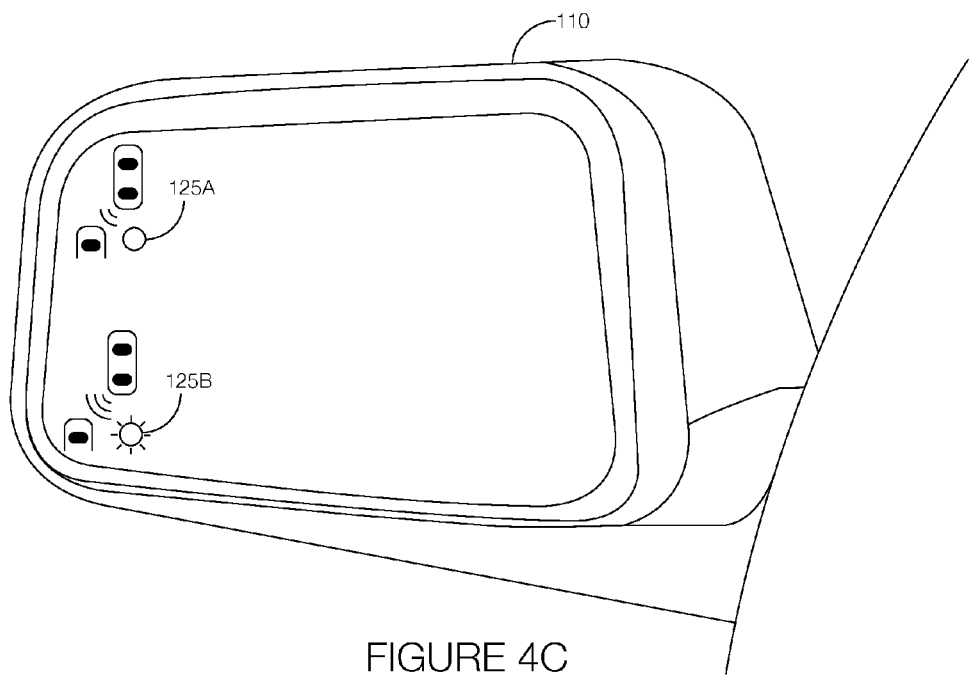

In FIG. 4C, the second indicator lights 125B is illuminated or flashing. It will be illuminated if the extended lane blind spot detection system 105 detects a target vehicle in the extended lane blind spot. It will flash if the extended lane blind spot detection system 105 detects the target vehicle moving quickly toward the extended lane blind spot.

Figure 4D:
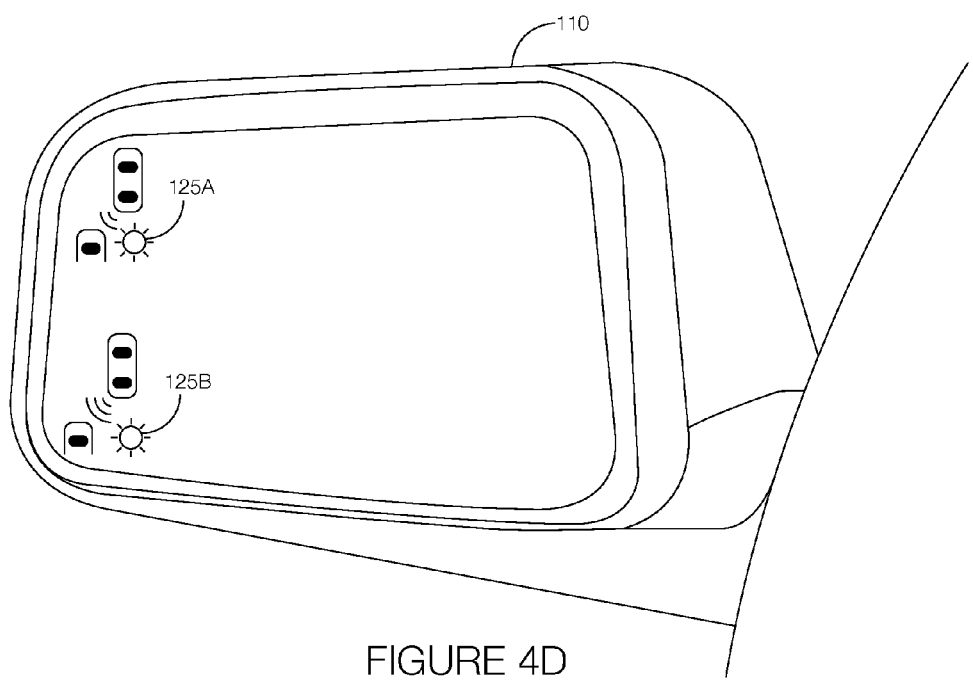

In FIG. 4D, both the first indicator lights 125A and the second indicator lights 125B are illuminated or flashing. The first indicator lights 125A will be illuminated if the extended lane blind spot detection system 105 detects a target vehicle in the adjacent lane blind spot. It will flash if the extended lane blind spot detection system 105 detects the target vehicle moving quickly toward the adjacent lane blind spot. The second indicator lights 125B will be illuminated if the extended lane blind spot detection system 105 detects a target vehicle in the extended lane blind spot. It will flash if the extended lane blind spot detection system 105 detects the target vehicle moving quickly toward the extended lane blind spot. Sometimes, as discussed above with reference to FIGS. 3C and 3F, the same target vehicle may cause one indicator light 125 to flash and the other to illuminate. For instance, the target vehicle 305 of FIG. 3C may cause the second indicator lights 125B to illuminate because it is in the extended lane blind spot and the first indicator lights 125A to flash because it is quickly moving toward the adjacent lane blind spot. The target vehicle 305 of FIG. 3F is in the adjacent lane but in the extended lane blind spot since the present lane of the host vehicle 100 is an onramp or otherwise separated from the adjacent lane until the two lanes merge. This is another instance where the first indicator lights 125A may flash, depending on how quickly the target vehicle is moving toward the adjacent lane blind spot, and the second indicator lights 125B may be illuminated because it is detected in the second lane blind spot.

Figure 5:
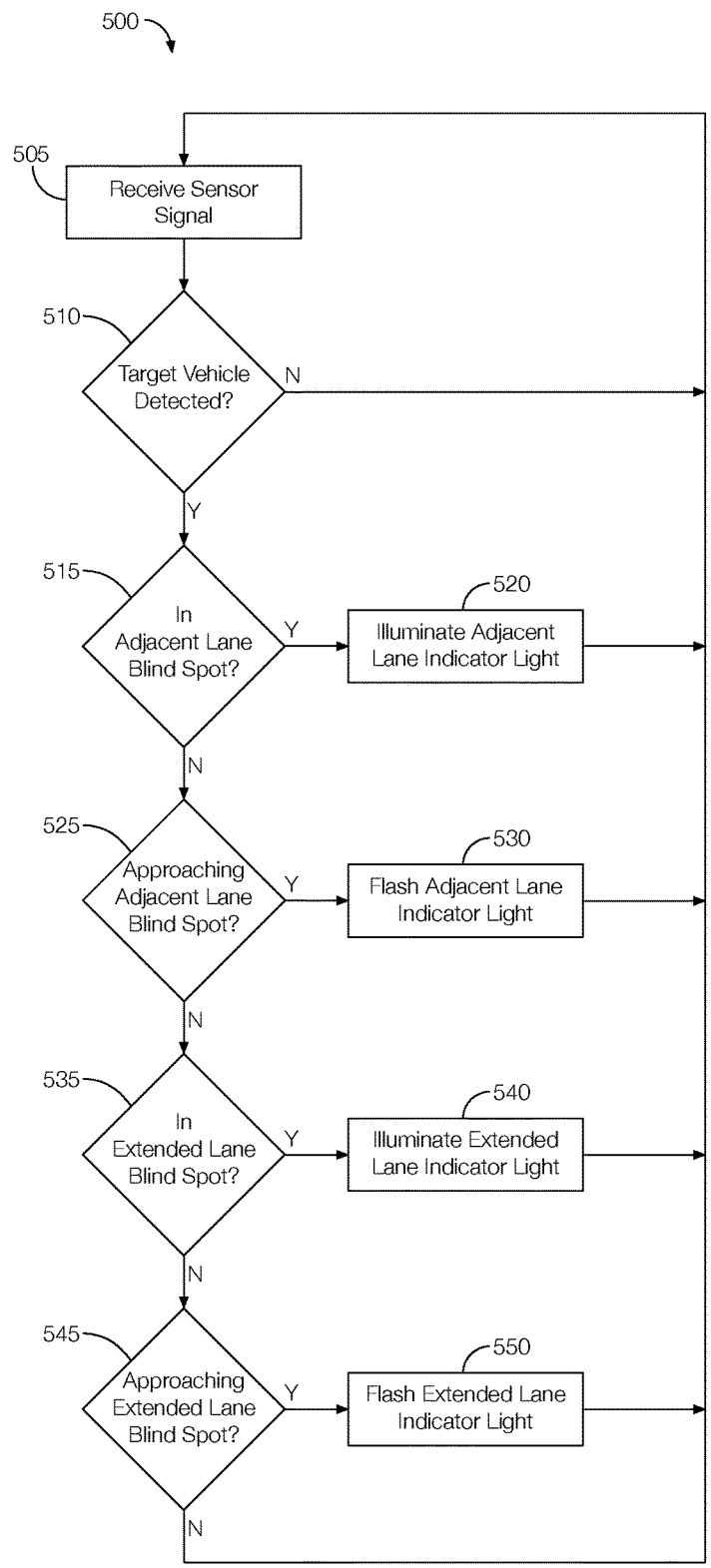
FIG. 5 is a flowchart of an example process that may be executed by the extended lane blind spot detection system.

FIG. 5 is a flowchart of an example process 500 that may be executed by the extended lane blind spot detection system 105. The process 500 may be initiated any time while the host vehicle 100 is operating, and it may continue to execute until the host vehicle 100 is shut down or the extended lane blind spot detection system 105 is otherwise turned off. Further, the process 500 may be one example of a number of similar processes executed. For instance, the extended lane blind spot detection system 105 may execute the process 500 for each sensor 115, each side view mirror 110, or both. Thus, it is likely that the process 500 will be executed multiple times simultaneously.

At block 505, the extended lane blind spot detection system 105 may receive a detection signal. The detection signal may be generated by a sensor 115 such as a radar sensor, a lidar sensor, a visual sensor (e.g., a camera), an ultrasound sensor, etc. and output to the processor 120.

At decision block 510, the extended lane blind spot detection system 105 may determine whether a target vehicle is detected. The processor 120 may process the detection signal to determine whether a target vehicle is in or quickly approaching one of the blind spots, such as the adjacent lane blind spot, the extended lane blind spot, or both. If the target vehicle is detected, the process 500 may proceed to block 515. If no target vehicles are detected, the process 500 may proceed to block 505.

At decision block 515, the extended lane blind spot detection system 105 may determine whether the detected target vehicle is in the adjacent lane blind spot. The processor 120 may make such a determination based on the data included in the detection signal. If the target vehicle is in the adjacent lane blind spot, the process 500 may proceed to block 520. Otherwise, the process 500 may proceed to block 525.

At block 520, the extended lane blind spot detection system 105 may illuminate the indicator light 125 associated with the adjacent lane (e.g., the first indicator lights 125A). That is, the processor 120 may output an alert signal to the first indicator lights 125A, causing the first indicator lights 125A to remain illuminated so long as the target vehicle remains in the adjacent lane blind spot. The process 500 may proceed to block 505 so that additional detection signals may be received and processed.

At decision block 525, the extended lane blind spot detection system 105 may determine whether the target vehicle is quickly moving toward the adjacent lane blind spot. The processor 120 may make such a determination based on the data included in the detection signal. If the target vehicle is quickly approaching the adjacent lane blind spot, the process 500 may proceed to block 530. Otherwise, the process 500 may proceed to block 535.

At block 530, the extended lane blind spot detection system 105 may flash the indicator light 125 associated with the adjacent lane (e.g., the first indicator lights 125A). That is, the processor 120 may output an alert signal to the first indicator lights 125A, causing the first indicator lights 125A to keep flashing so long as the target vehicle appears to be quickly approaching the adjacent lane blind spot. The process 500 may proceed to block 505 so that additional detection signals may be received and processed.

At decision block 535, the extended lane blind spot detection system 105 may determine whether the target vehicle is in the extended lane blind spot. The processor 120 may make such a determination based on the data included in the detection signal. If the target vehicle is in the extended lane blind spot, the process 500 may proceed to block 540. Otherwise, the process 500 may proceed to block 545.

At block 540, the extended lane blind spot detection system 105 may illuminate the indicator light 125 associated with the extended lane (e.g., the second indicator lights 125B). That is, the processor 120 may output an alert signal to the second indicator lights 125B, causing the second indicator lights 125B to remain illuminated so long as the target vehicle remains in the extended lane blind spot. The process 500 may proceed to block 505 so that additional detection signals may be received and processed.

At decision block 545, the extended lane blind spot detection system 105 may determine whether the target vehicle is quickly moving toward the extended lane. The processor 120 may make such a determination based on the data included in the detection signal. If the target vehicle is quickly approaching the extended lane blind spot, the process 500 may proceed to block 550. Otherwise, the process 500 may proceed to block 505.

At block 550, the extended lane blind spot detection system 105 may flash the indicator light 125 associated with the extended lane (e.g., the second indicator lights 125B). That is, the processor 120 may output an alert signal to the second indicator lights 125B, causing the second indicator lights 125B to keep flashing so long as the target vehicle appears to be quickly approaching the extended lane blind spot. The process 500 may proceed to block 505 so that additional detection signals may be received and processed.

The appropriate indicator lights 125 turned on during the process 500 may remain on so long as at least one sensor 115 continues to detect a target vehicle in the circumstance corresponding to the illuminated indicator light 125. The appropriate indicator lights 125 may be turned off if and when no sensors 115 detect the target vehicle in the circumstance corresponding to the illuminated indicator light 125.

With this process 500, alone or being executed simultaneously for each sensor 115, side view mirror 110, or both, the extended lane blind spot detection system 105 can detect target vehicles in the adjacent lane and in the extended lane and notify the driver of the host vehicle 100 when such other vehicles are present. The notifications by the extended lane blind spot detection system 105 can serve as a back-up to the situation where the driver looks over his or her shoulder for vehicles in the rear quarter blind spot in the adjacent lane, the extended lane, or both, as well as help the driver make decisions about when to start a lane change, whether to complete a lane change, or whether to abort a lane change by, e.g., moving back to the previous lane.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, New York, the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   at least one sensor programmed to detect a first target vehicle in a first blind spot and a second target vehicle in a second blind spot, wherein the first blind spot is associated with an adjacent lane relative to a host vehicle and wherein the second blind spot is associated with an extended lane relative to the host vehicle;
   a first indicator light located in a vehicle side view mirror;
   a second indicator light located in the vehicle side view mirror; and
   a processor programmed to generate a first alert signal when the first target vehicle is detected and a second alert signal when the second target vehicle is detected, wherein the processor is programmed to output the first alert signal to illuminate the first indicator light and output the second alert signal to illuminate the second indicator light.

2. The vehicle system of claim 1, wherein the at least one sensor is incorporated into a vehicle side view mirror.

3. The vehicle system of claim 1, wherein the processor is programmed to detect a third target vehicle in the adjacent lane moving toward the first blind spot.

4. The vehicle system of claim 3, wherein the processor is programmed to generate the first alert signal when the third target vehicle is detected in the adjacent lane and moving toward the first blind spot.

5. The vehicle system of claim 4, wherein the processor is programmed to generate the first alert signal when the third target vehicle is detected in the adjacent lane and moving toward the first blind spot at at least a predetermined speed relative to the host vehicle.

6. The vehicle system of claim 3, wherein the processor is programmed to detect a fourth vehicle in the extended lane moving toward the second blind spot.

7. The vehicle system of claim 6, wherein the processor is programmed to generate the second alert signal when the fourth target vehicle is detected in the extended lane and moving toward the second blind spot.

8. The vehicle system of claim 7, wherein the processor is programmed to generate the second alert signal when the fourth target vehicle is detected in the extended lane and moving toward the second blind spot at at least a predetermined speed relative to the host vehicle.

9. The vehicle system of claim 1, wherein the adjacent lane is next to a present lane of the host vehicle.

10. The vehicle system of claim 9, wherein the adjacent lane is between the present lane of the host vehicle and the extended lane.

11. The vehicle system of claim 9, wherein the present lane is an entrance ramp and wherein the adjacent lane merges with the present lane.

12. A method comprising:
    detecting a first target vehicle in a first blind spot associated with an adjacent lane relative to a host vehicle;
    detecting a second target vehicle in a second blind spot associated with an extended lane relative to the host vehicle;
    generating a first alert signal when the first target vehicle is detected;
    outputting the first alert signal to a first indicator light located in a side view mirror of the host vehicle;
    generating a second alert signal when the second target vehicle is detected; and
    outputting the second alert signal to a second indicator light located in the side view mirror of the host vehicle.

13. The method of claim 12, further comprising:
    detecting a third target vehicle in the adjacent lane moving toward the first blind spot; and
    generating the first alert signal when the third target vehicle is detected in the adjacent lane and moving toward the first blind spot.

14. The method of claim 13, wherein the first alert signal is generated when the third target vehicle is detected in the adjacent lane and moving toward the first blind spot at at least a predetermined speed relative to the host vehicle.

15. The method of claim 12, further comprising:
    detecting a fourth target vehicle in the extended lane moving toward the second blind spot; and
    generating the second alert signal when the fourth target vehicle is detected in the extended lane and moving toward the second blind spot.

16. The method of claim 15, wherein the second alert signal is generating when the fourth target vehicle is detected in the extended lane and moving toward the second blind spot at at least a predetermined speed relative to the host vehicle.

* * * * *